United States Patent [19]
Amstad

[11] Patent Number: 5,307,738
[45] Date of Patent: May 3, 1994

[54] FOOD PROCESSING MACHINE

[76] Inventor: John H. Amstad, 6807 W. 100th Ter., Overland Park, Kans. 66212-1634

[21] Appl. No.: 81,229

[22] Filed: Jun. 25, 1993

[51] Int. Cl.⁵ .......................... A23N 7/00; A47J 17/14
[52] U.S. Cl. ...................................... 99/625; 99/540; 99/623; 99/628; 99/631
[58] Field of Search ................... 99/574, 575, 623-630, 99/631-633, 510, 511, 540; 426/481-483; 15/3.2, 3.19; 134/132

[56] References Cited

U.S. PATENT DOCUMENTS

| | | | |
|---|---|---|---|
| 1,025,405 | 5/1912 | King | 99/628 |
| 1,194,318 | 8/1916 | Power | 99/575 |
| 1,234,698 | 7/1917 | Foote | 99/626 |
| 1,274,803 | 8/1918 | Spitz | 99/575 |
| 3,347,295 | 10/1967 | Feiling | 99/628 |
| 4,068,574 | 1/1978 | Amstad | 99/628 |
| 4,196,224 | 4/1980 | Falk | 426/483 |
| 4,230,034 | 10/1980 | Amstad | 99/623 |
| 4,258,069 | 3/1981 | Amstad | 426/483 |
| 4,842,883 | 6/1989 | Amstad | 15/3.2 |
| 5,106,641 | 4/1992 | Bichel | 99/629 |

FOREIGN PATENT DOCUMENTS 0655382 4/1979 U.S.S.R. ................................. 99/630

Primary Examiner—Timothy F. Simone

[57] ABSTRACT

A dry food processing machine designed to clean and polish vegetables such as potatoes as well as various fruits. The machine includes inner and outer, concentrically arranged, inverted, frusto-conical rotatable members which are concentrically spaced from one another to provide a product cleaning space therebetween. The conical members are rotatably driven in opposite or synchronous directions at selected speeds. Rotation produces a centrifugal force to the product which constitutes a vertical and horizontal component of force. Abrading devices are provided in the cleaning apace to assist in cleaning. Product is introduced through the inner member into the cleaning space and the provided vertical force will drive the product upwardly through the cleaning space for removal of material for final delivery of product to a collector cowling. Material removed rom the product will be driven horizontally from the cleaning space through the outer conical member for collection.

19 Claims, 4 Drawing Sheets

5,307,738

FOOD PROCESSING MACHINE

RELATED APPLICATIONS

There are no related applications currently on file in the United States Patent Office with which this application should be considered.

FEDERAL SPONSORSHIP

This invention is not made under any federally sponsored research and development arrangement nor any other sponsored research and development arrangement which should be noted.

FIELD OF THE INVENTION

This invention relates generally to a machine for peeling, abrading and removing the skin and surface blemishes and the cleaning and polishing of various food products and more particularly to a device which accomplishes the desired results utilizing the vertical and horizontal components of the centrifugal force provided by rotating conical structures to deliver treated product upwardly for final delivery and to deliver the refuse of treating horizontally for disposal. The machine substantially eliminates the use of flush water and may use only a minimal amount of water.

SHORT SUMMARY OF THE INVENTION

A food processing machine for treating the exterior of food products such as potatoes, turnips, carrots, parsnips, rutabagas, beets, etc. as well as various fruits. The machine includes a pair of concentric, frusto-conical members, each of which is arranged for rotation with the rotation and speed thereof being selectable to provide for counter rotation as well as co-rotation.

A product introduction area is provided within the interior of the inner cone to introduce the product to a cleaning area between the cones. The exterior, product carrier cone is provided with product advancing depressions and passages therethrough for the delivery of the removed material to a collection cowling surrounding the upper end of the carrier cone.

The inner cone is provided with spaced abrading members on the exterior surface thereof which extend into the product cleaning area to provide the desired product skin treatment.

The product advances upwardly between the two cones due to the vertical force component applied thereto and the removed material passes through the passagess in the exterior cone due to the horizontal component of the rotating, carrier cone.

The product collection cowling area or ring is provided for the collection and delivery of the cleaned product and is angularly arranged with respect to the frame of the unit for gravity delivery of the cleaned product. An angularly arranged refuse collector is provided for collection and delivery of the removed skin and other product refuse from a downwardly depending cone which rotates with the exterior, carrier cone and which is delivered refuse material through the passages through the carrier cone.

The device is designed to operate with a minimal amount of, or no water and particularly no flush water for debris removal, to substantially eliminate water or other fluids or steam applications for proper cleaning of the product.

Product disbursement devices may be arranged within the product introduction area such that the introduced product is properly spaced and disbursed into the cleaning area.

BACKGROUND AND OBJECTS OF THE INVENTION

Various methods and apparatus for cleaning various vegetable and food products including the peeling, abrading and removal of skin and surface blemishes as well as cleaning and polishing of the product have been developed and used with various degrees of success. These include both mechanical and non-mechanical devices.

Mechanical devices which have been used in the past include tubs with internal scraping surfaces such as carborundum and bristle spindles arranged in cascading frames or in circular drum or trough structures. Most of these have previously used units have shortcomings due to lack of contour action whereby the product had to be ground down to the deepest blemish and due to excessive use of water to flush the removed waste. These and other shortcomings resulted in nigh product losses and as a result various means were devised for the application of steam, chemicals, infra-red rays, lasers and simply water. Most of these attempts provided results that were less than desirable.

For example, when high pressure steam was utilized it boiled off the skin only partially and the product, potatoes for example, had to be subsequently run through skin eliminators with the attendant additional requirement of large quantities of water.

Attempts at overcoming waste of flush water have been made and various patents, as listed in the Prior Art Statement, are concerned with such units. Such arrangements also included spindle drum units, perforated drums or cages which were defined by spaced apart rods or possibly carborundum units.

The applicant provides a unit which replaces flush water by applied centrifugal force through a spinning product carrier cone which expels waste material through annular openings therein due to the horizontal force vector, with the product being advanced upwardly to discharge due to the vertical force vector of centrifugal force. The annular openings may be provided by making such outer carrier cone of mesh or expanded metal.

An object of the applicant's device is characterized by allowing cleaning action only down to a predetermined depth, generally not beyond the thickness of the skin.

Another object of the invention is the concept of bringing the product into a bed of abrading, peeling and polishing means where the product can act relatively freely but within a controlled manner and atmosphere which assures that full surface coverage is accomplished.

It is a further object of the applicant's invention to provide a food processing machine which incorporates a pair of centric cone elements with means for controlling direction and rotational speed of the cones for the removal, abrading and the like of the exteriors of various food products with the removed portions of the skin being directed outwardly by the horizontal vector component of centrifugal force and the cleaned product being directed upwardly by the vertical vector component of the centrifugal force.

It is still a further object of the applicant's invention to provide a substantially waterless food processing machine wherein a pair of inverted, frusto-conical elements are provided having rotational and directional control for each of said elements with the product being introduced into the inner of such cones and disbursed therein into the cleaning area between the cones.

It is still a further object of the applicant's invention to provide a food processing machine in which a pair of inverted, spaced, frusto-conical elements are arranged with abrading means provided on the exterior of the interior cone and product advancement depressions are arranged on the interior of the outer cone.

It is still a further object of the applicant's invention to provide a food processing machine in which a product collection area in the form of a cowling arranged angularly to horizontal is provided for receipt and delivery of the cleaned product and a refuse collection area in the form of a cowling arranged at angularly to horizontal is provided to receive and deliver the refuse removed from the product.

These and other objects and advantages of the invention will more fully appear from a consideration of the accompanying drawings and description.

DESCRIPTION OF A PREFERRED FORM OF THE INVENTION

Figure 1:
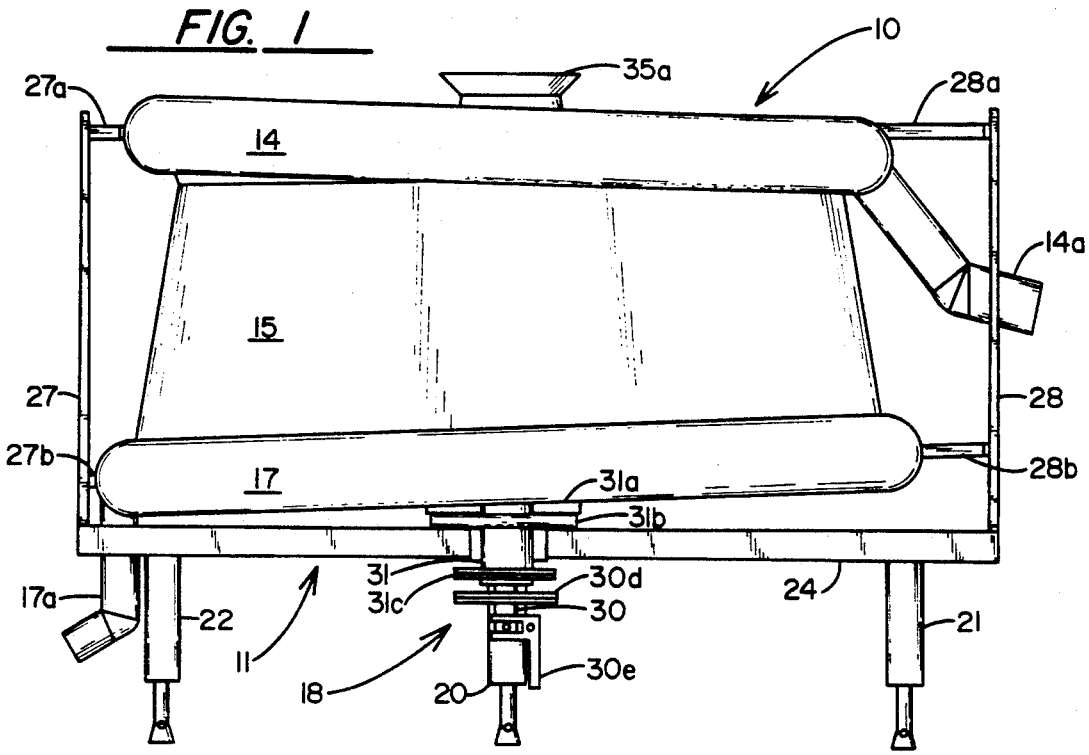
FIG. 1 is a frontal elevation of the food processing machine embodying the concepts of the applicant's invention.

As illustrated in the accompanying drawings the applicant's food processing machine is generally designated 10 and basically includes a framework 11, a pair of inverted frusto-conical members 12, 13, a product receiving and delivery cowling member 14 surrounding the upper or open end of the conical member 13, a debris sling cone also referred to as a refuse directing cone 15, and a refuse and skin collecting cowling member 17 surrounding and receiving debris and refuse from the sling cone 15. Means for driving the frusto-conical members 12, 13 is provided and is generally designated 18. The outer, 13 conical member is defined as a product carrier member and the inner 12 conical member is defined as an abrading member.

Figure 2:
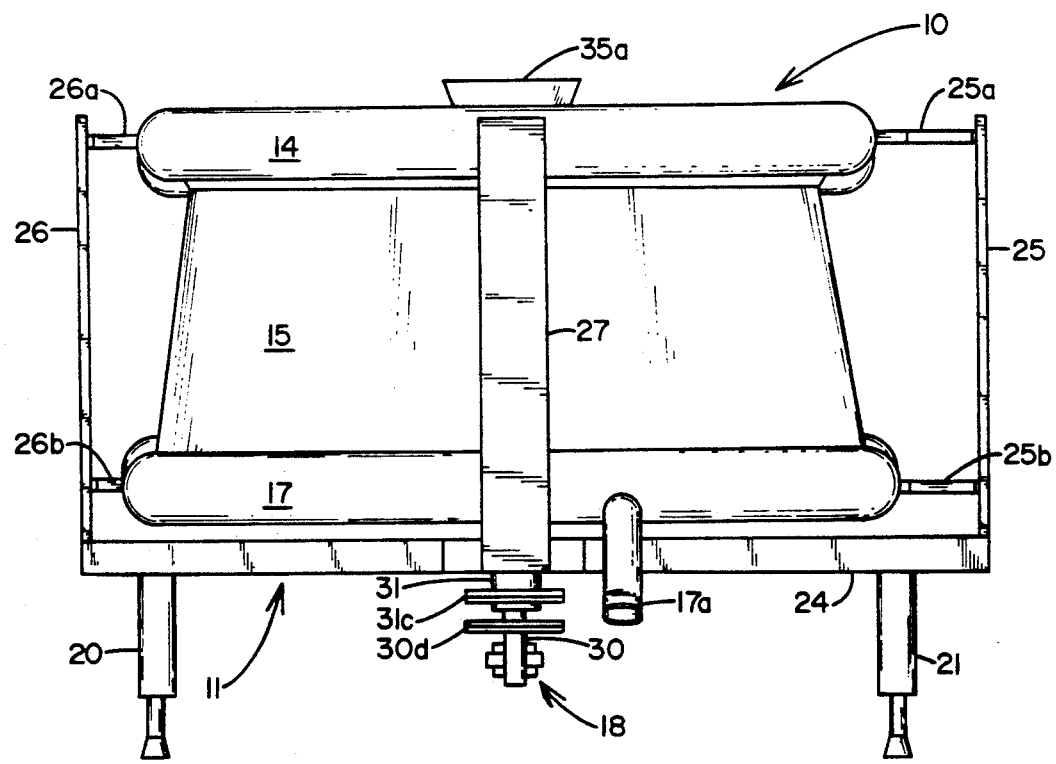
FIG. 2 is a side elevation of the unit.
Figure 3:
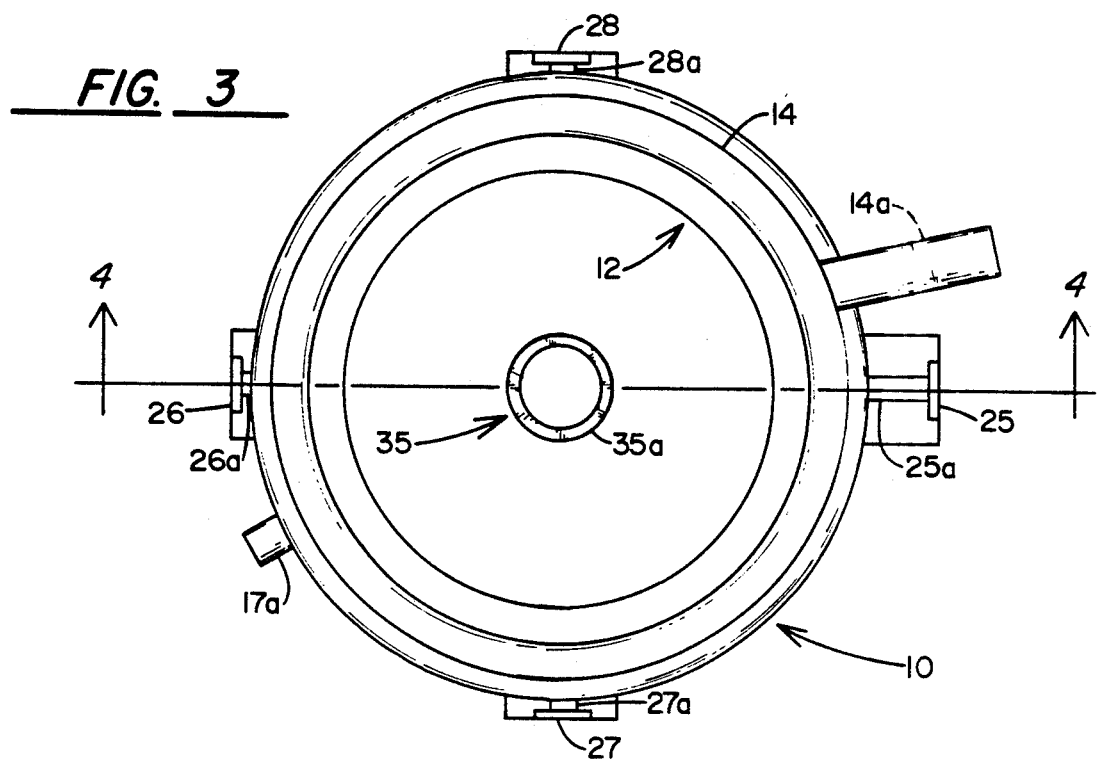
FIG. 3 is a top plan view thereof.

As best illustrated in FIGS. 1 and 2 the framework 11 includes adjustable legs 20, 21, 22. The number of legs for support of the unit is immaterial. The framework 11 also includes a lower support member 24 having a plurality of upstanding side supports 25, 26, 27, 28 with inwardly directed arms 25a, 26a, 27a, 28a to support the upper product delivery cowling 14 and inwardly extending arms 25b, 26b, 27b, 28b to support the lower refuse discharge cowling 17.

Drive means 18 includes means for driving both of the frusto-conical members 12, 13.

The means for driving the inner, frusto-conical, abrading member 12 includes a first shaft 30 extending upwardly to an upwardly tapered, product disbursement end 30a and being arranged in a bearing housing 31 with the bearings for such shaft 30 being designated 30b, 30c. A drive sheave 30d is provided on shaft 30 for driving the same and interconnected conical member 12. Product disbursement end 30a is tapered upwardly and inwardly and is provided with a plurality of extending arms 32 attached to inner frusto-conical member 12 for driving thereof. The inner frusto-conical member may be arranged eccentrically with regard to the outer frusto-conical member 13 simply by providing a bend in drive shaft 30 or by selectively lengthening and shortening certain of the drive arms 32 extending between the shaft 30 and the inner frusto-conical member 12.

Means for driving the outer, frusto-conical product carrier member 13 include bearing housing 31 having an upper radially extending shoulder 31a which is secured to the bottom surface 13a of such outer conical member 13. This shoulder 31 is supported by framework section 24 and thrust bearing 31b. A drive sheave 31c is provided on housing 31 for driving of the same.

It should be obvious that this driving structure 18 permits independent driving control of the frusto-conical members 12, 13 to allow for co-rotation or counter rotation at selectable speeds.

In the form shown, means for shifting and controlling the spacing, between the frusto-conical members 12, 13 and thus the size of cleaning area 40 is controlled by moving inner conical member 12 upwardly through a controlled clevis member 30e.

Figure 4:
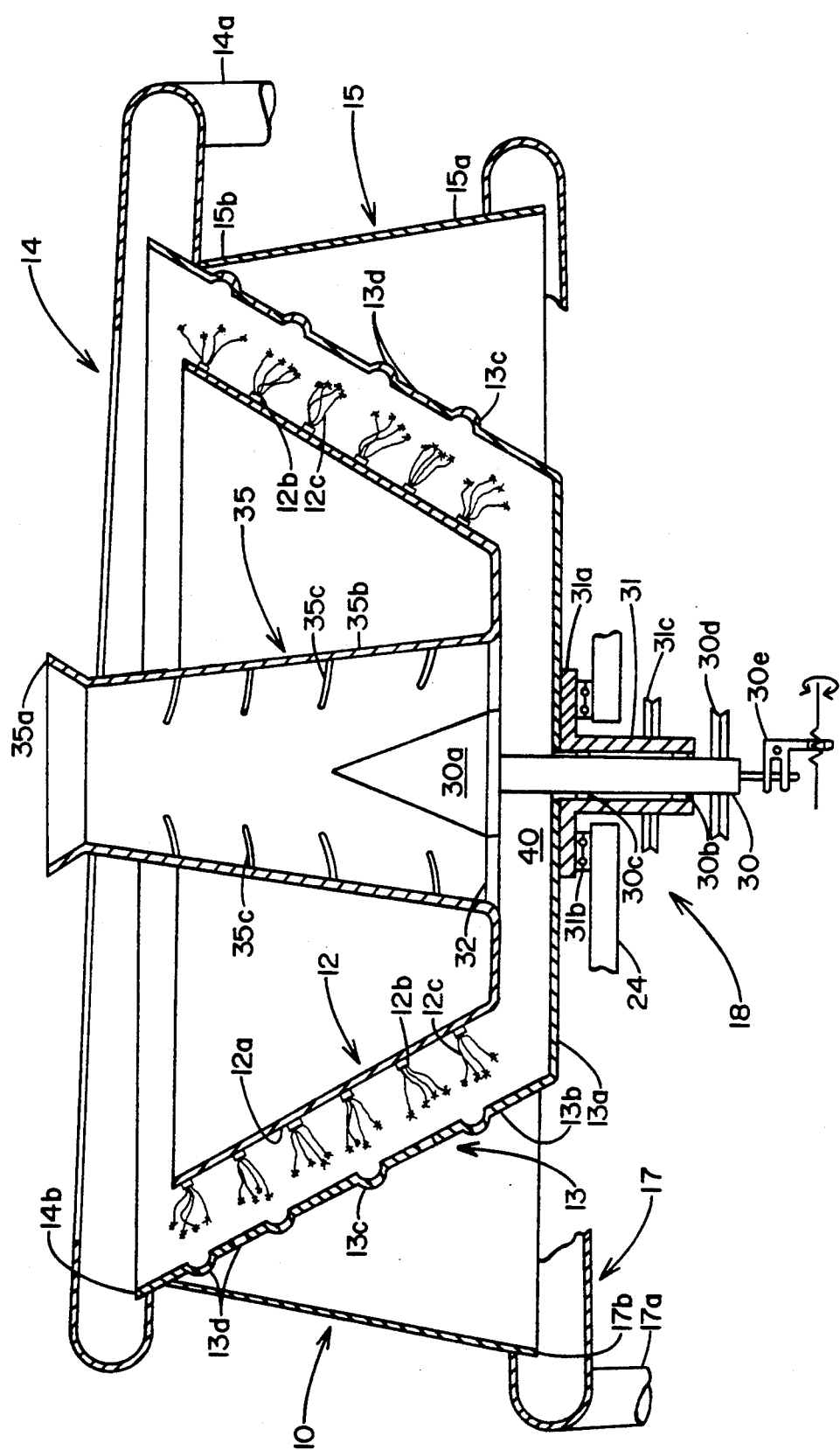
FIG. 4 is a vertical section taken substantially along Line 4—4 of FIG. 3.
Figure 5:
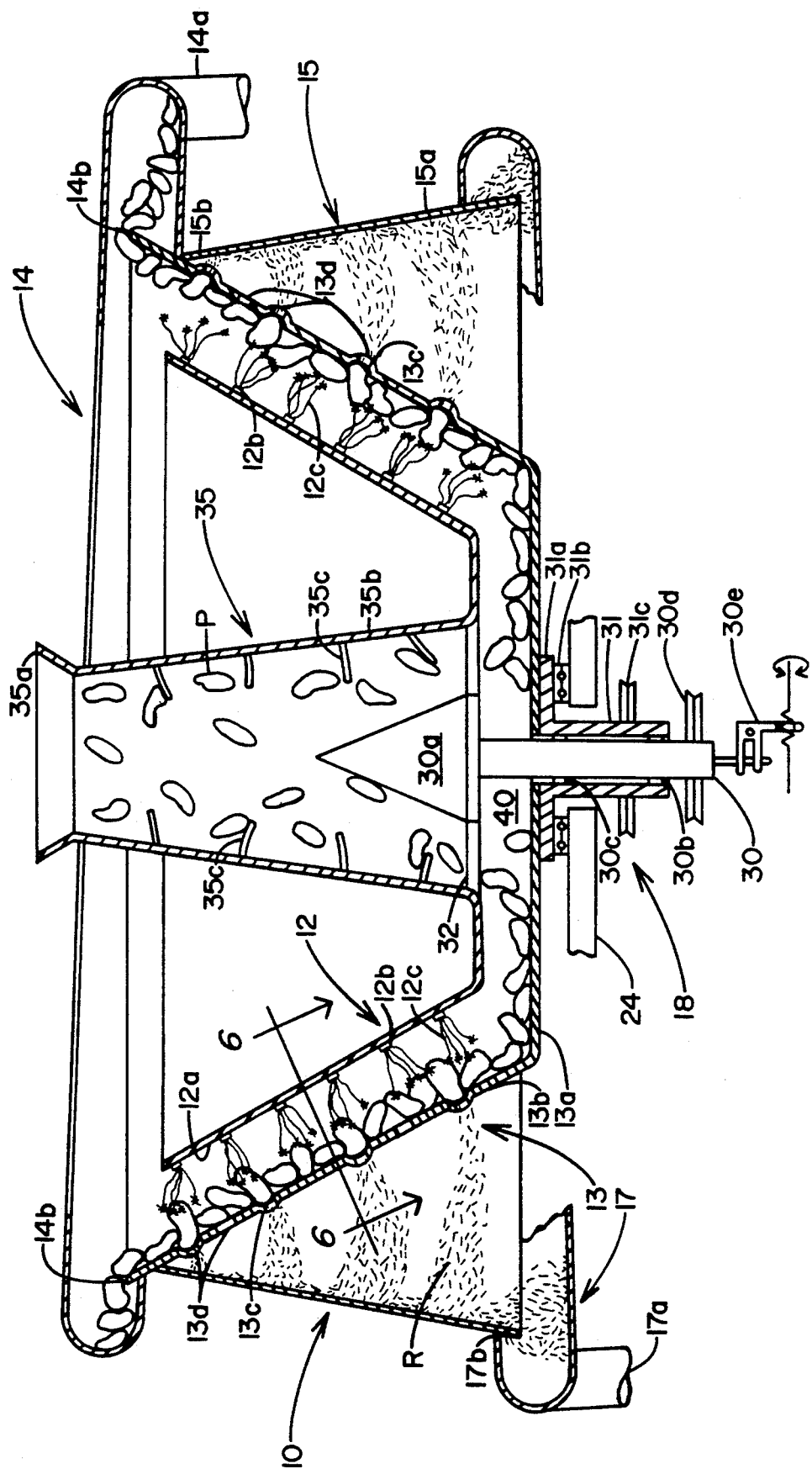
FIG. 5 is a view similar to FIG. 4 and illustrating product as it would travel through the device and further illustrating the discharge of the treated product and the removed refuse material; and, FIG. 6 is a section taken substantially along Line 6—6 of FIG. 5 illustrating a typical abrading device acting against a product for refuse removal.

As best illustrated in FIGS. 4 and 5, a product entrance or feed structure 35 includes a frusto-conical member having an entrance end 35a normally positioned above the cones and having an outwardly and downwardly tapered side 35b with the lowermost end of said side being secured to the bottom 12a of inner conical member 12 for the flow of product through the structure 35, past the connective arms 32 and into the cleaning area 40. Also arranged interiorly of this product entrance structure 35 may be a plurality of internally directed arms 35c which assist in disbursement of the product in combination with the tapered end 30a of the internal drive arrangement. These arms 35c may be flexible so as not to damage the entering product.

Figure 6:
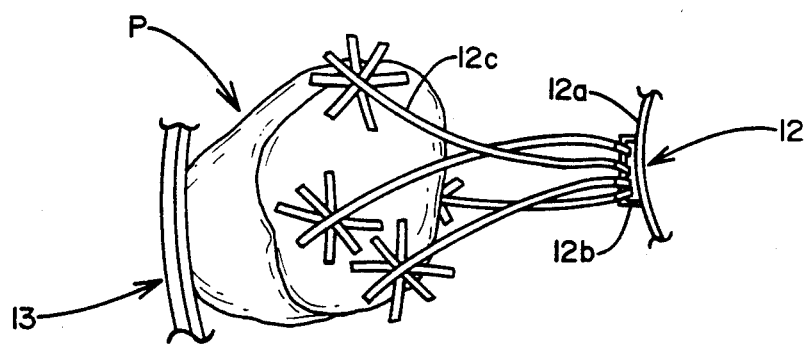

Arranged on the exterior surface 12a of the inner frusto-conical member 12 are a plurality of spaced, product abrading members as illustrated in one form in FIG. 6. In the form shown and simply illustrative of such an abrading member, applicant provides a connective or mounting element 12b arranged on the exterior surface 12a of member 12 and a plurality of whipping or abrading elements 12e arranged thereon. Obviously these elements 12c may take many different forms but the aspect thereof is to provide abrading for the product P being processed. As particularly illustrated in FIG. 5, these abrading elements 12b, 12c are arranged in spaced vertical relation as well as spaced circumferential relation on the exterior surface 12a of conical member 12.

The exterior frusto-conical, product carrier member 13 provides a flat bottom area 13a and the upwardly directed conical section 13b. Arranged in spaced relationship on the exterior member 13 are a plurality of outwardly directed dimpled or depressed areas 13c, each of which has a passage 13d formed therein for the passage of skin and refuse R from the cleaning area 40 outwardly to a primary collection area, sling cone 15. As illustrated, the passage areas 13d may be located at many locations about the exterior cone 13 and they are not limited to the dimpled or outwardly extending areas 13c. These dimples 13c basically prevent the product P from dropping downwardly from the angularly directed wall 13b and prevent uncontrolled upward movement of the product by temporarily retaining and intermittently holding the product and with the addition of the of the horizontal force component provides end-over-end movement of the product. In this manner, complete contour action and cleaning is accomplished.

The side walls 13b of the outer conical member 13 may be formed from a mesh or expanded metal without departing from the scope of the invention.

As best illustrated in FIGS. 4 and 5 the refuse directing or sling cone 15 provides an open bottomed structure and is only defined by the outwardly and downwardly directed side 15a having its upper end 15b secured to outer conical member 13 for rotation therewith. The refuse moving through apertures 13d of the outer conical member 13 is directed into the sling cone 15 and will drop therefrom due to the vertical force component and gravity to the refuse collection cowling 17.

The unit, as stated, includes two discharge areas 14, 17.

The upper discharge cowling 14 provides a toroidal shape having a receiving area 14b and is designed to receive the treated product therein and is stationary with respect to the framework 11 through arms 25a, 25b, 26c, 26d and is arranged at an angle with respect to the top of the outer frusto-conical member 13 and framework 13 such that the finished product will flow by gravity to a discharge chute 17a. There is free passage from the cleaning area 40 for the product to pass into this slanted cowling 14 and from chute 14a. The treated product advances upwardly through the cleaning area due to the vertical force component of centrifugal force created by rotation of the conical arrangement which will ultimately place the product P into the discharge collection doughnut 14 for final delivery from the discharge chute 14a.

The lower refuse collection element 17 again is a cowling, stationery with respect to the framework 11 for gravity delivery of refuse discharge chute 17a. Again, this cowling 17 has a refuse receiving opening 17b to receive refuse from the sling cone 15.

A basic principal of the machine is to utilize the created centrifugal force which of course has, when working against an angularly arranged side, a vertical component of force and a horizontal component of force. The vertical component will drive the cleaned product upwardly and the horizontal component of force will drive the refuse from the cleaning area 40 into the sling cone 15 for final delivery to the refuse cowling 17.

Applicant has made reference to the machine being substantially waterless. Basically applicant's machine eliminates the use of any flush water for the removal of debris and refuse and does not require any significant amount of water to the product being treated. There are certain conditions that may require the application of a minimal amount of water to the product being treated and such conditions include dust control due to a product bearing or carrying dirt and, for example, a particularly dry product which may require fluid or water for more efficient operation of the machine. Such water application would, however, be minimal.

It should be obvious that applicant has provided a new and unique food processing machine which relies on certain physical laws for its operation and which does not rely on complex mechanical arrangements to accomplish the desired results.

What is claimed is:

1. A food processing machine particularly arranged and designed to abrade, peel and otherwise treat the exterior surface of various food products, including:
   a. a support framework;
   b. a pair of centrically arranged conical members rotatably provided on said framework and positioned in radially spaced relation from one another to provide a product treatment area therebetween.
   c. means for selectively, rotatably driving said conical members;
   d. means for introducing the food product to be treated into said product treatment area;
   e. refuse passing apertures provided through the exterior of the outer conical member for passing removed particulates from said treatment area due to the horizontal component of the centrifugal force provided by rotation of said exterior conical member;
   f. product surface contacting means carried on the exterior surface of the interior of said conical members extending into said treatment area for treating the exterior surface of the product to a desired condition;
   g. exit means at the upper end of said treatment area for delivery of the treated product, the product advancing to said exit means due to the vertical component of the centrifugal force provided by rotation of said exterior conical member.

2. The food processing machine as set forth in claim 1 and said means for rotatably driving said conical members includes means for independently driving each of said members.

3. The food processing machine as set forth in claim 1 and said means for introducing the food product into said product treatment area including:
   a. the inner of said conical members providing a bottom having an aperture therethrough communicating with said cleaning area; and,
   b. said food product introduction means including a downwardly directed conical member communicating with said aperture for delivery of the food product thereto.

4. The food processing machine as set forth in claim 3 and said downwardly directed conical member including inwardly directed product disbursement and directing means for substantially equally disbursing the food product.

5. The food processing machine as set forth in claim 3 and:
   a. said means for rotatably driving said conical members includes means for independently driving each of said members;
   b. said means for driving said inner conical member including a drive shaft extending upwardly into said aperture of said bottom of said inner conical member;
   c. arms extending from said drive shaft and arranged in driving relation to said inner conical member; and,
   d. the uppermost end of said drive shaft being substantially conical in shape to assist in food product disbursement.

6. The food processing machine as set forth in claim 5 and said inner of said centrically arranged conical members being mounted eccentrically with respect to the exterior of said conical members.

7. The food processing machine as set forth in claim 3 and said food product introduction entrance end extending above said inner conical member.

8. The food processing machine as set forth in claim 1 and:
   a. a product receiving cowling of a toroidal shape surrounding the upper end of said exterior conical member;
   b. said product receiving cowling having a product entrance opening therein; and
   c. means for discharging the product from said product receiving cowling.

9. The food processing machine as set forth in claim 8 and said product discharge means including:
   a. means for mounting said cowling in slanted fashion on said framework to allow the product to move therethrough by gravity; and,
   b. a discharge chute arranged on said cowling for final discharge of the treated food product from said cowling.

10. The food processing machine as set forth in claim 1 and means for varying the radially spaced distance between said conical members whereby the product treatment area may be modified in size.

11. The food processing machine as set forth in claim 10 wherein said means for varying the radially spaced distance between said conical members includes means for shifting said inner conical member with respect to said exterior conical member.

12. The food processing machine as set forth in claim 1 and said inner conical member being provided with a plurality of abrading elements on the exterior surface thereof and extending into said product treatment area.

13. The food processing machine as set forth in claim 1 and said exterior conical member being provided with a plurality of radially extending depressions for temporarily receiving food product therein as the same is advanced upwardly due to the upward force component of centrifugal force and preventing downwardly movement of the product and holding the product for proper surface treatment.

14. The food processing machine as set forth in claim 1 and said exterior conical member being formed of an open mesh material.

15. The food processing machine as set forth in claim 1 and a downwardly and outwardly refuse receiving cone secured to the outer surface of said exterior cone for rotation therewith, the refuse passing through said refuse passing passages of said exterior conical member being driven therein by the horizontal component of the provided centrifugal force.

16. The food processing machine as set forth in claim 15 and a refuse receiving cowling of toroidal shape being arranged adjacent the bottom of said refuse receiving cone to receive refuse therefrom.

17. The food processing machine as set forth in claim 16 and said refuse receiving cowling providing refuse discharge means.

18. The food processing machine as set forth in claim 17 and said refuse discharge means including:
   a. said refuse receiving cowling being arranged on said framework in slanted fashion to allow refuse to move therethrough by gravity; and,
   b. a delivery chute arranged on said cowling.

19. The food processing machine as set forth in claim 1 wherein said driving means includes for driving said conical members in co-rotational direction and in counter-rotation.

* * * * *